(12) United States Patent
Jackson (10) Patent No.: US 8,340,829 B2
(45) Date of Patent: Dec. 25, 2012

(54) METHOD AND APPARATUS OF DETECTING AND COMPENSATING FOR DC RESIDUAL FAULT CURRENTS ON ELECTRICAL SYSTEMS

(75) Inventor: Jonathan Keith Jackson, Argyll (GB)

(73) Assignee: Eaton Industries Manufacturing GmbH (CH)

( * ) Notice: Subject to any disclaimer, the term of this patent is extended or adjusted under 35 U.S.C. 154(b) by 1012 days.

(21) Appl. No.: 12/374,008

(22) PCT Filed: Jul. 13, 2007

(86) PCT No.: PCT/GB2007/002638
§ 371 (c)(1),
(2), (4) Date: Jan. 15, 2009

(87) PCT Pub. No.: WO2008/009903
PCT Pub. Date: Jan. 24, 2008

(65) Prior Publication Data
US 2010/0014197 A1 Jan. 21, 2010

(30) Foreign Application Priority Data

Jul. 15, 2006 (GB) .................................. 0614125.3

(51) Int. Cl.
*G05D 7/00* (2006.01)
*G05D 11/00* (2006.01)
*G05D 3/12* (2006.01)
*G05D 5/00* (2006.01)
*G05D 9/00* (2006.01)
*G05D 17/00* (2006.01)
*H02H 3/00* (2006.01)
*H02H 9/08* (2006.01)
*G01R 31/14* (2006.01)
*G01R 31/00* (2006.01)
*G01R 19/00* (2006.01)
*G01R 13/00* (2006.01)

(52) U.S. Cl. .......... 700/291; 700/282; 700/293; 361/42; 324/509; 324/511; 702/58; 702/64; 702/65; 702/69

(58) Field of Classification Search .................. 700/282, 700/291, 293; 361/42; 324/509, 511; 702/58, 702/64, 65, 69
See application file for complete search history.

(56) References Cited

U.S. PATENT DOCUMENTS 4,321,681 A * 3/1982 Sackin et al. ................. 700/293
(Continued)

FOREIGN PATENT DOCUMENTS

DE   10 2005 028 881 A1   1/2007
(Continued)

OTHER PUBLICATIONS

International Search Report Dated Oct. 25, 2007, Deepstream Technologies Limited, PCT/GB2007/002638.
(Continued)

*Primary Examiner* — Ronald Hartman, Jr.
(74) *Attorney, Agent, or Firm* — McKee, Voorhees & Sease, P.L.C.

(57) ABSTRACT

This invention relates to a method and apparatus of detecting and compensating for DC residual fault currents on electrical systems. In particular, the present invention relates to a method and apparatus which is capable of accurately detecting one or more parameters of the fault current waveform and generating a compensation factor which compensates for specific pulsed DC fault components present. In this way, trip sensitivity is optimized for all types of fault current waveforms. In a preferred embodiment, the present invention operates by detecting one or more parameters of the encoded fault current waveform and generating a measure of symmetry comparing the mean squared values of negative and positive sections of said encoded fault current waveform. In use, various bands of the ratio of the mean squared sum of the positive and negative sections of said encoded fault current waveform are obtained, and a compensation factor is determined from a look-up table stored in a processing means.

45 Claims, 2 Drawing Sheets

Fault Current

Time

U.S. PATENT DOCUMENTS

| | | | | |
|---|---|---|---|---|
| 4,809,123 | A | * | 2/1989 | Allington et al. ............... 361/42 |
| 5,309,346 | A | * | 5/1994 | Gyugyi ........................... 363/54 |
| 5,974,361 | A | * | 10/1999 | Vu et al. .......................... 702/69 |
| 6,397,156 | B1 | * | 5/2002 | Bachmann et al. ............. 702/65 |
| 6,597,999 | B1 | * | 7/2003 | Sinha et al. ..................... 702/64 |
| 6,992,490 | B2 | * | 1/2006 | Nomoto et al. ............... 324/522 |
| 7,009,825 | B2 | | 3/2006 | Lambardin et al. |
| 7,127,364 | B2 | * | 10/2006 | Kang et al. ...................... 702/64 |
| 7,626,396 | B2 | * | 12/2009 | Lindsey et al. ................ 324/509 |
| 7,714,587 | B2 | * | 5/2010 | Lindsey et al. ................ 324/509 |
| 2005/0094344 | A1 | * | 5/2005 | Kang et al. ..................... 361/115 |
| 2010/0188786 | A1 | * | 7/2010 | Darmann ........................ 361/19 |
| 2011/0057444 | A1 | * | 3/2011 | Dai et al. ........................ 290/44 |

FOREIGN PATENT DOCUMENTS

| | | |
|---|---|---|
| EP | 1 322 018 A2 | 6/2003 |
| EP | 1 479 148 B1 | 10/2005 |
| WO | WO 2004/017483 A1 | 2/2004 |
| WO | WO 2008/009903 A1 | 1/2008 |

OTHER PUBLICATIONS

Written Opinion of the International Searching Authority Dated Oct. 25, 2007, Deepstream Technologies Limited, PCT/GB2007/002638.

* cited by examiner

Fault Current

Fault Current

Fig. 4

Fault Current

METHOD AND APPARATUS OF DETECTING AND COMPENSATING FOR DC RESIDUAL FAULT CURRENTS ON ELECTRICAL SYSTEMS

This invention relates to a method and apparatus of detecting and compensating for DC residual fault currents on electrical systems. In particular, the present invention relates to a method and apparatus which is capable of accurately detecting one or more parameters of the fault current waveform and generating a compensation factor which compensates for specific pulsed DC fault components present. In this way, trip sensitivity is optimised for specific types of fault current waveforms.

Circuit protection devices, such as digital residual current devices, are routinely used to monitor and protect against electrocution and fire risks on electrical installations. The principle of operation of these devices is well known, and a toroidal current transformer is used to measure the sum of the live and neutral currents. The current transformer detects the magnetic fields of the two mains conductors which flow in opposite directions and cancel in normal circumstances. The mains conductors form single turns on the magnetic toroidal core and a secondary winding of many turns is used to detect any magnetisation of the toroidal core.

A typical fault may occur where a person touches the live conductor downstream of the residual current device allowing extra current to flow through live to ground, through the person. Since this current does not return in the neutral line, then an imbalance is detected in the toroidal current transformer. The signal detected by the current transformer is referred to as a residual current. Such a signal is seen as a current in the secondary winding, which can be processed using analogue or digital processing means. If the outcome of the processing step is that a dangerous condition exists, then a signal can be used to energise a mechanical actuator which then operates a tripping mechanism, opening the mechanical contacts and isolating the electrical supply.

Unfortunately, the inductive nature of the detection technique ensures that the toroidal current transformer is relatively insensitive to any steady or pulsed DC fault components that can be present on the electrical system, and which can ultimately prevent the device from operating correctly in a fault condition. These steady or pulsed DC components that could be present in the fault current are a manifestation of the vast number of semiconductor devices which are now incorporated in equipment used throughout industry, commerce and in domestic situations. The presence of such complex semiconductor loads may result in the normal sinusoidal AC waveform being replaced by non-sinusoidal fault components that would, in certain circumstances, not be detected by conventional RCDs.

In this regard, RCDs are classified into various performance classes (IEC/EN 61008/61009):

Type AC—protects against AC fault currents only (i.e. the average value of waveform is zero);

Type A—protects against AC and pulsating DC components (this assumed to mean average value is not zero, but waveform minimum is zero); and Type B—protects against the above and smooth (i.e., continuous) DC components.

Unfortunately, the classification tests required for type A pulsed DC waveforms (i.e., switched sine wave at 90° and 135°) happen to differ in their apparent RMS value through a current transformer but only a little from a normal sinusoidal AC waveform of equal RMS. Therefore, a type A RCD device operates correctly, if tested using these pulsed DC waveforms, however, there are other fault waveforms which are likely to arise which do not give correct RMS readings through the current transformer and which could prevent the RCD from tripping even in the event of a dangerous fault.

IEC Committee 64 (Working Group 22) has been expressing concerns over the wording of the requirements for RCDs supposedly able to function correctly with pulsed DC fault currents (TC23E/SecO107/RM, Annex B). In this regard, it is believed that it may become necessary to pass more stringent tests to achieve type A approval or, if this remains, then A+ type approval might be introduced, which are able to protect against certain other pulsed DC fault waveforms.

It is the object of the present invention to provide a method and apparatus of detecting and compensating for specific pulsed DC residual fault currents on electrical systems. The method and apparatus enabling accurate detection of one or more parameters of the fault current waveform and generating a compensation factor which compensates for all of the identified types of pulsed DC fault components present. In this way, trip sensitivity can be optimised for all types of fault current waveforms. It is a further object of the present invention to provide a residual current device capable of safely and reliably disconnecting hazardous sinusoidal AC and steady or pulsed DC residual fault currents on electrical systems, and being less susceptible to nuisance tripping. The present invention being capable of meeting both existing and anticipated further International standards.

According to the present invention there is provided a method of disconnecting an electric supply to an electrical installation upon detection of a predetermined fault current between the line and neutral conductors of said electric supply, said line and neutral conductors inductively coupled as a primary winding of a current transformer, the method comprising the steps of:

monitoring a fault current waveform from the output of a secondary winding inductively coupled to said current transformer and responsive to said fault current on said electrical installation;

digitally encoding said fault current waveform outputted from said secondary winding;

detecting one or more parameters of said encoded fault current waveform and generating a compensation factor which compensates for specific pulsed DC fault components present in said encoded fault current waveform;

weighting said encoded fault current waveform in accordance with said compensation factor; and tripping a trip mechanism if said weighted fault current waveform exceeds said predetermined fault current.

Also according to the present invention there is provided an apparatus for disconnecting an electric supply to an electrical installation upon detection of a predetermined fault current between the line and neutral conductors of said electric supply, said line and neutral conductors inductively coupled as a primary winding of a current transformer, the method comprising the steps of:

monitoring means for monitoring a fault current waveform from the output of a secondary winding inductively coupled to said current transformer and responsive to said fault current on said electrical installation;

encoding means for digitally encoding said fault current waveform outputted from said secondary winding;

detection means for detecting one or more parameters of said encoded fault current waveform and generating a compensation factor which compensates for specific pulsed DC fault components present in said encoded fault current waveform;

weighting means for weighting said encoded fault current waveform in accordance with said compensation factor; and tripping means for tripping a trip mechanism if said weighted fault current waveform exceeds said predetermined fault current.

Further according to the present invention there is provided a computer program product for disconnecting an electric supply to an electrical installation upon detection of a predetermined fault current between the line and neutral conductors of said electric supply, said line and neutral conductors inductively coupled as a primary winding of a current transformer, the method comprising the steps of:

computer program means for monitoring a fault current waveform from the output of a secondary winding inductively coupled to said current transformer and responsive to said fault current on said electrical installation;

computer program means for digitally encoding said fault current waveform outputted from said secondary winding;

computer program means for detecting one or more parameters of said encoded fault current waveform and generating a compensation factor which compensates for specific pulsed DC fault components present in said encoded fault current waveform;

computer program means for weighting said encoded fault current waveform in accordance with said compensation factor; and computer program means for tripping a trip mechanism if said weighted fault current waveform exceeds said predetermined fault current.

Preferably, the encoding means, detection means, and weighting means are implemented in a processing means which may be a microprocessor or digital signal processor. In use, said processing means is programmable and includes other ancillary features, such as, undervoltage release and warning indication. Further preferably, said secondary winding is a single or multi-turn winding.

In a preferred embodiment, the one or more parameters of said encoded fault current waveform may be selected from: duty cycle, ratio of RMS values of the positive and negative portions of waveform, positive and negative peak values, number of zero crossings, form factor and crest factor. Alternatively, the one or more parameters of said encoded fault current waveform can be obtained from more complex types of waveshape analysis, such as template matching and spectral analysis.

Further preferably, the one or more parameters of said encoded fault current waveform are obtained from a measure of symmetry that is used to compare the mean squared values of negative and positive sections of said encoded fault current waveform. In use, this parameter can be obtained by using the ratio of the mean squared sum of the positive and negative halves of said encoded fault current waveform. Preferably, to ensure that the resultant compensation factor is insensitive to inversion of said encoded fault current waveform, if the ratio is less than one, then the reciprocal is used.

Preferably, the ratio of the mean squared sum of the positive and negative halves of said encoded fault current waveform involves separately taking the IIR-averaged (infinite impulse response) mean square of all negative values and positive values separately. In use, various bands of these ratios are obtained, and said compensation factor is determined from a look-up table stored in said processing means.

In a preferred embodiment, if the ratio of the mean squared sum of the positive and negative halves of said encoded fault current waveform lies within the range 1.00 to 1.22, then a sinusoidal AC fault current waveform is detected and a compensation factor of 1.00 is generated. If the ratio of the mean squared sum of the positive and negative halves of said encoded fault current waveform lies within the range 1.22 to 1.51, then a full wave rectified DC fault current waveform is detected and a compensation factor of 1.68 is generated. If the ratio of the mean squared sum of the positive and negative halves of said encoded fault current waveform lies within the range 1.51 to 1.67, then a 'M' wave rectified (as defined later herein) DC fault current waveform is detected and a compensation factor of 5.28 is generated. If the ratio of the mean squared sum of the positive and negative halves of said encoded fault current waveform lies within the range 1.67 to 3.00, then a half wave rectified DC fault current waveform is detected and a compensation factor of 3.66 is generated. If the ratio of the mean squared sum of the positive and negative halves of said encoded fault current waveform lies within the range 3.00 to 7.12, then a 90° switched sine fault current waveform is detected and a compensation factor of 1.25 is generated. If the ratio of the mean squared sum of the positive and negative halves of said encoded fault current waveform lies within the range 7.12 to ∞, then a 135° switched sine fault current waveform is detected and a compensation factor of 1.10 is generated.

It is believed that a method and apparatus in accordance with the present invention at least addresses the problems outlined above. The advantages of the present invention are that a method and apparatus of detecting and compensating for the identified DC residual fault currents on electrical systems is provided. Advantageously, the method and apparatus enabling accurate detection of one or more parameters of the fault current waveform and generating a compensation factor which compensates for all of the identified types of pulsed DC fault components present. In this way, trip sensitivity can be optimised for all types of fault current waveforms. Further advantageously, a residual current device is provided which is capable of safely and reliably disconnecting hazardous sinusoidal AC and steady or pulsed DC residual fault currents on electrical systems, and being less susceptible to nuisance tripping. The present invention being capable of meeting both existing and anticipated further International standards.

It will be obvious to those skilled in the art that variations of the present invention are possible and it is intended that the present invention may be used other than as specifically described herein.

A specific non-limiting embodiment of the invention will now be described by way of example and with reference to the accompanying drawings, in which.

Referring now to the drawings, the method and apparatus according to the present invention has been developed following rigorous empirical measurement and mathematical modelling of the various types of sinusoidal AC and pulsed DC residual fault currents that are currently used to test existing type A RCDs (IEC/EN 61008/61009). In addition, further analysis of a number of pulsed DC residual waveforms that are likely to be utilised for the anticipated more stringent type A+ classification tests has been undertaken to enable the present invention to be developed, which, in use, compensates for all DC fault components and offers unrivalled fault current sensitivity.

Figure 1:
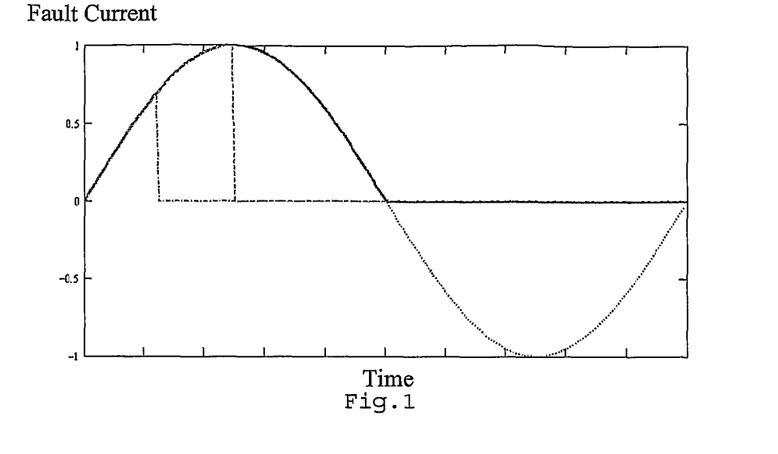
FIG. 1 illustrates the various types of sinusoidal AC and pulsed DC residual waveforms which are currently used to test existing type A RCDs (IEC/EN 61008/61009)

As shown in FIG. 1, existing type A RCDs are tested using the following waveforms: a sine wave; a switched sine wave at 0° (half wave rectified); a switched sine wave at 90°; and a switched sine wave at 135°. Additional waveforms are being proposed for the anticipated A+ rating: full wave rectified and half wave rectified, i.e. where the RCD is between two phases and earthed midpoint. This latter waveform resembles the letter 'M', and is referred to as such in the remainder of the description. These waveforms are shown schematically in FIGS. 2 and 3, respectively.

Figure 2:
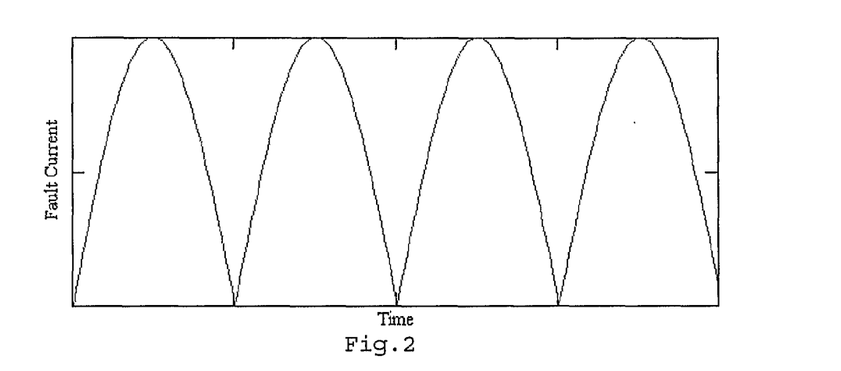
FIGS. 2 and 3 show further pulsed DC residual waveforms that are likely to be relevant for the anticipated more stringent type A+ classification tests.

FIG. 2. illustrates a full wave pulsed DC waveform that can occur in a centre-tapped system as is common in the United States, where the substation provides two 110V phases at 180° which can be combined to make a 220V supply. The centre tap is earthed. If equipment protected by the RCD has a full wave rectifier and a fault occurs allowing the rectified signal to leak to earth then a full wave fault current similar to that shown in FIG. 2 will be present.

Figure 3:
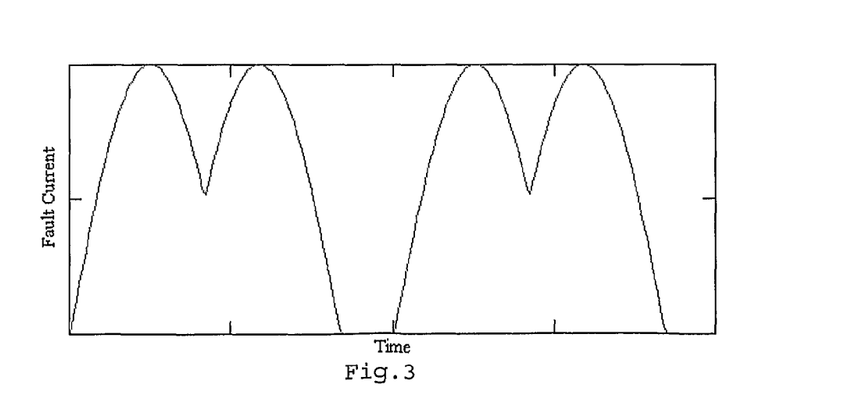

FIG. 3 shows the type of fault waveform that can occur if equipment is powered from two phases or a star point three phase supply, where the star point is earthed.

Experimental analysis using existing digital RCDs has been undertaken to observe what values of fault current are necessary to cause tripping for the various types of sinusoidal AC and pulsed DC residual fault waveforms noted above in FIGS. 1 to 3. A true RMS meter was used to measure the fault current, and the amplitude of the waveform increased until tripping occurred. Note that a maximum trip threshold value I$\Delta$n of 42 mA RMS is allowed for pulsed DC currents in a 30 mA rated RCD or 1.4I$\Delta$n (IEC/EN 61008/61009). For RCDs rated below 10 mA, 2I$\Delta$n is allowed and for all other RCDs the lower trip threshold is lowered to 0.35 I$\Delta$n (0 and 90°) and 0.11I$\Delta$n (135°). We shall however concentrate on the 30 mA rated device. The results are shown in Table 1. Bold type indicates failure to reach the proposed type A+ standard.

TABLE 1

Results of pulsed DC waveform tests

|  | RCD 1 | RCD 2 | RCD 3 | RCD 4 |
|---|---|---|---|---|
| AC waveform (reference) | 24 mA | 24 mA | 24 mA | 22 mA |
| Phase/grounded neutral (half wave rectified) | 29 mA | 29 mA | 28 mA | 28 mA |
| Between two phases - grounded star point ('M' waveform, as shown in FIG. 3) | 52 mA | 50 mA | 45 mA | 43 mA |
| Split phase 2 × 120 V (full wave rectified, as shown in FIG. 2) | 53 mA | 52 mA | 51 mA | 48 mA |

Figure 4:
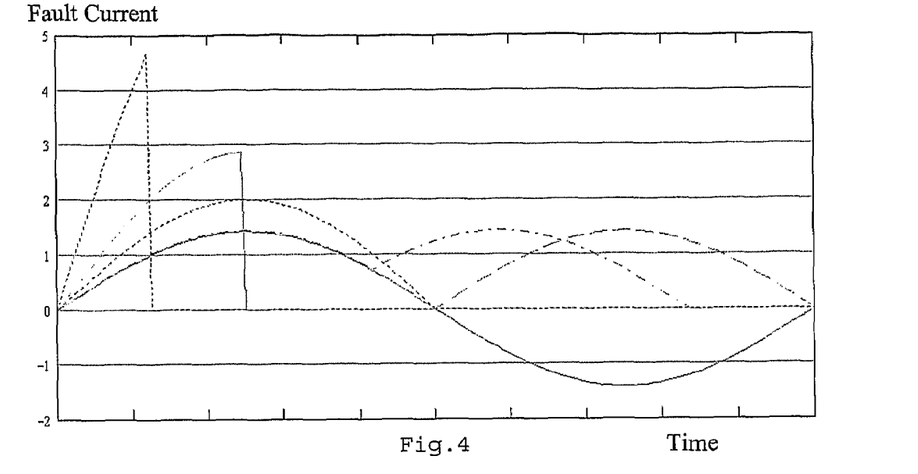
FIG. 4 illustrates the various sinusoidal AC and pulsed DC residual waveforms that would be present at the input to the primary side of the current transformer of an RCD.
Figure 5:
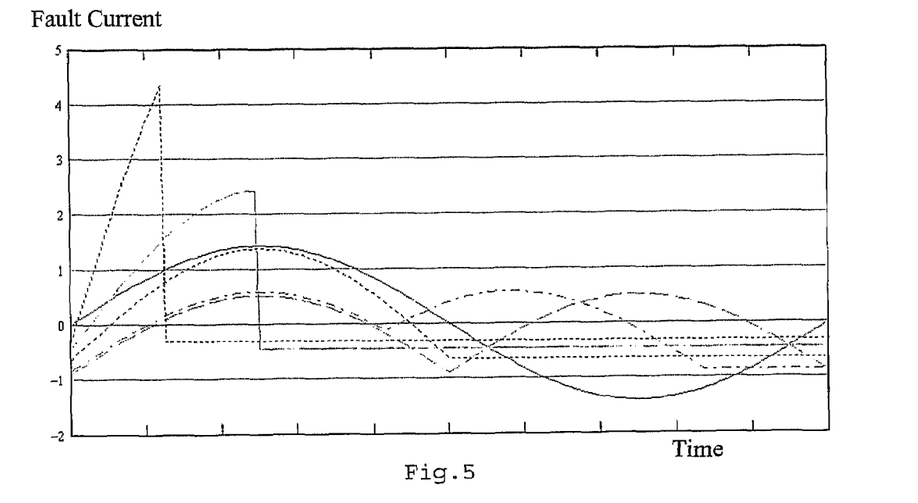
FIG. 5 shows how the DC component of the waveforms of FIG. 4 are blocked since the current transformer is insensitive to the DC component of the waveform being measured and which effectively increases the trip threshold for the various pulsed DC residual currents.

Clearly, the failure to reach the type A standard across the full range of pulsed DC residual waveforms occurs because a current transformer is used as a sensor for measuring the fault currents and so any DC component of the fault current is blocked. Therefore, the waveforms shown in FIG. 4 would be present at the primary side of the current transformer, noting that these waveforms are normalised to give equal RMS values of unity. Since the current transformer is insensitive to the DC component of the waveform being measured, the current transformer actually "sees" the various waveforms shown in FIG. 5.

It is interesting to note that the sine wave is used as a reference and has a 42 mA RMS (i.e., 59 mA peak) value. The other waveforms have all moved downwards so their average value is zero. This now results in their RMS values decreasing from 42 mA, and thus giving a false reading. From experimental data these error factors are shown in Table 2. These figures represent the amounts above the trip threshold I$\Delta$n needed to trip the RCD with a threshold of I$\Delta$n.

TABLE 2

Measured tripping factors for various pulsed DC waveforms

| Fault waveform | Tripping Factor |
|---|---|
| Sine | 1.0 |
| Half wave | 1.3 |
| Full wave | 2.3 |
| 'M' waveform | 1.9 |
| 90° switched sine | Not tested |
| 135° switched sine | Not tested |

This problem has been analysed mathematically and this is now detailed. The RMS values of the various types of sinusoidal AC and pulsed DC residual waveforms for unity peak amplitude have been calculated, as follows in Table 3.

TABLE 3

RMS values of pulsed DC waveforms

| Waveform | RMS calculation | Simplified form | RMS value |
|---|---|---|---|
| Sine | $\sqrt{\dfrac{\int_0^{2\pi}(\sin(x))^2\,dx}{2\pi}}$ | $\dfrac{1}{\sqrt{2}}$ | 0.707 |
| Half wave | $\sqrt{\dfrac{\int_0^{\pi}(\sin(x))^2\,dx}{2\pi}}$ | $\dfrac{1}{2}$ | 0.500 |
| Full wave | $\sqrt{\dfrac{\int_0^{\pi}(\sin(x))^2\,dx}{\pi}}$ | $\dfrac{1}{\sqrt{2}}$ | 0.707 |
| 'M' wave | $\sqrt{\dfrac{\int_{\frac{\pi}{6}}^{\pi}(\sin(x))^2\,dx}{\pi}}$ | $\sqrt{\dfrac{10\pi+3\sqrt{3}}{24\pi}}$ | 0.697 |
| 90° switched sine | $\sqrt{\dfrac{\int_{\frac{\pi}{2}}^{\pi}(\sin(x))^2\,dx}{2\pi}}$ | $\dfrac{1}{\sqrt{8}}$ | 0.353 |
| 135° switched sine | $\sqrt{\dfrac{\int_{\frac{3\pi}{4}}^{\pi}(\sin(x))^2\,dx}{2\pi}}$ | $\sqrt{\dfrac{1-\dfrac{2}{\pi}}{16}}$ | 0.151 |

These waveforms need their amplitudes normalised to give unity RMS values. Table 4 shows the RMS normalisation factors for the various sinusoidal AC and pulsed DC residual waveforms that have been obtained by multiplying the reciprocals of the figures shown in Table 3.

TABLE 4

RMS normalisation factors for pulsed waveforms

| Waveform | Normalisation factor |
|---|---|
| Sine | $\sqrt{2}$ |
| Half wave | 2 |
| Full wave | $\sqrt{2}$ |
| 'M' wave | 1/1.434 |
| 90° switched sine | $\sqrt{8}$ |
| 135° switched sine | 1/0.151 |

Table 4 indicates that, for example, a full rectified wave must have a peak amplitude of 1.414 to have an RMS of 1. These are the amplitudes of the waveforms that should have caused the RCD to trip when fed into the device (i.e., the device measures 30 mA for these waveforms when their true RMS is 30 mA). However, the above figures do now allow for loss of DC coupling. The effect of the DC coupling is to move the waveforms down by their average values, and these are as shown in Table 5.

TABLE 5

Average value of pulsed DC waveforms after normalisation

| Waveform | Average calculation | Simplified form | Average value |
|---|---|---|---|
| Sine | $\dfrac{\int_0^{2\pi} \sqrt{2}\cdot\sin(x)\,dx}{2\pi}$ | 0.00 | 0.00 |
| Half wave | $\dfrac{\int_0^{\pi} 2\cdot\sin(x)\,dx}{2\pi}$ | $\dfrac{2}{\pi}$ | 0.636 |
| Full wave | $\dfrac{\int_0^{\pi} \sqrt{2}\cdot\sin(x)\,dx}{\pi}$ | $\dfrac{2\sqrt{2}}{\pi}$ | 0.900 |
| 'M' wave | $\dfrac{\int_0^{\frac{5\pi}{6}} \sqrt{\dfrac{24\pi}{10\pi+3\sqrt{3}}\sin(x)}\,dx}{\pi}$ | $\dfrac{2\sqrt{6}+3\sqrt{2}}{\sqrt{(10\pi+3\sqrt{3})\pi}}$ | 0.852 |
| 90° switched sine | $\dfrac{\int_{\frac{\pi}{2}}^{\pi} \sqrt{8}\cdot\sin(x)\,dx}{2\pi}$ | $\dfrac{\sqrt{2}}{\pi}$ | 0.45 |
| 135° switched sine | $\dfrac{\int_{\frac{3\pi}{4}}^{\pi} \sqrt{\dfrac{16}{1-\dfrac{2}{\pi}}}\cdot\sin(x)\,dx}{2\pi}$ | $\dfrac{2-\sqrt{2}}{\sqrt{\pi(\pi-2)}}$ | 0.309 |

These DC values are subtracted from the normalised waveforms (i.e. RMS=1) and the RMS recalculated as shown in Table 6.

TABLE 6

RMS of normalised DC pulsed waveforms on the secondary side of the current transformer

| Waveform | RMS calculation | Integrated expression | RMS value |
|---|---|---|---|
| Sine | $\sqrt{\dfrac{\int_0^{2\pi} (\sqrt{2}\sin(x))^2\,dx}{2\pi}}$ | 1 | 1.000 |
| Half wave | $\sqrt{\dfrac{\int_0^{\pi}\left(2\sin(x)-2\dfrac{2}{\pi}\right)^2 dx + \int_{\pi}^{2\pi}\left(\dfrac{2}{\pi}\right)^2 dx}{2\pi}}$ | $\sqrt{1-\dfrac{4}{\pi^2}}$ | 0.771 |
| Full wave | $\sqrt{\dfrac{\int_0^{\pi}\left(\sqrt{2}\sin(x)-2\dfrac{\sqrt{2}}{\pi}\right)^2 dx}{\pi}}$ | $\sqrt{1-\dfrac{8}{\pi^2}}$ | 0.435 |

TABLE 6-continued

RMS of normalised DC pulsed waveforms on the secondary side of the current transformer

| Waveform | RMS calculation | Integrated expression | RMS value |
|---|---|---|---|
| 'M' wave | $\sqrt{\dfrac{\int_{\frac{\pi}{6}}^{\pi}\left(\sqrt{\dfrac{24\pi}{10x+3\sqrt{3}}}\sin(x)-\dfrac{2\sqrt{6}+3\sqrt{2}}{\sqrt{(10\pi+3\sqrt{3})\pi}}\right)^2 dx+\int_{0}^{\frac{\pi}{6}}\left(\dfrac{2\sqrt{6}+3\sqrt{2}}{\sqrt{(10\pi+3\sqrt{3})\pi}}\right)^2 dx}{\pi}}$ | Too large to fit here | 0.523 |
| 90° switched sine | $\sqrt{\dfrac{\int_{\frac{\pi}{2}}^{\pi}\left(\sqrt{8}\sin(x)-\dfrac{\sqrt{2}}{\pi}\right)^2 dx+\int_{\frac{\pi}{2}}^{2\pi}\left(\dfrac{\sqrt{2}}{\pi}\right)^2 dx}{2\pi}}$ | $\sqrt{1-\dfrac{2}{\pi^2}}$ | 0.893 |
| 135° switched sine | $\sqrt{\dfrac{\int_{\frac{3\pi}{4}}^{\pi}\left(\sqrt{\dfrac{16}{\left(1-\dfrac{2}{\pi}\right)}}\sin(x)-\dfrac{2-\sqrt{2}}{\sqrt{\pi(\pi-2)}}\right)^2 dx+\int_{\frac{\pi}{4}}^{2\pi}\left(\dfrac{2-\sqrt{2}}{\sqrt{\pi(\pi-2)}}\right)^2 dx}{2\pi}}$ | $\sqrt{1+\dfrac{\sqrt{32}-6}{\pi(\pi-2)}}$ | 0.951 |

Relative to the sine wave, the ratios of the RMS and mean squared (MS) values are shown below in Table 7.

TABLE 7

Error as factors in measurement of DC pulsed waveforms

| Waveform | Ratio (RMS) | Ratio (MS) |
|---|---|---|
| Sine | 1.00 | 1.00 |
| Half wave | 1.29 | 1.68 |
| Full wave | 2.30 | 5.28 |
| 'M' wave | 1.91 | 3.66 |
| 90° switched sine | 1.11 | 1.25 |
| 135° switched sine | 1.05 | 1.10 |

The skilled person will note that these figures agree very well with the ratios from the experimental results, as shown in Table 2. Assuming a worst-case trip threshold IΔn of 30 mA, then the full wave, half wave and the 'M' wave will not cause a trip, and as is borne out from experiment.

To arrive at the solution set out in the present application, an algorithm is described which will compensate for the errors caused by lack of DC coupling. The only clue to the particular fault current waveform present on the other side of the current transformer is its shape. However, we can never tell what DC offset is applied, and so a type B device is still not possible. For anticipated type A+ standard, we assume the waveform has no constant DC offset. To measure true DC, techniques such as modulating the core to saturation are needed which is deemed too costly and difficult to implement at low cost and power.

The algorithm must be simple to implement, since, generally, little processing power is available. The algorithm will be based on one or more parameters of the fault waveform which can be easily measured without excessive processing. The following parameters are those which fit this requirement:
  Duty Cycle
  Ratio of RMS of positive and negative portions of waveform
  Positive and negative peak values
  Number of zero crossings
  Form Factor
  Crest Factor What is then required is some combination of the above-derived figures from the other measures, which can produce a correction factor suitable for correcting the errors for the particular waveform shape. In addition, it should not affect normal sinusoidal waveforms and should always be safe (i.e., the correction factor should be grater than unity, which makes the RCD more sensitive).

The skilled person will appreciate that more complex types of analysis such as template matching and spectral analysis are possible, but these tend to require heavy processing which is unacceptable, as it requires more power and probably more complex hardware.

Figure 6:
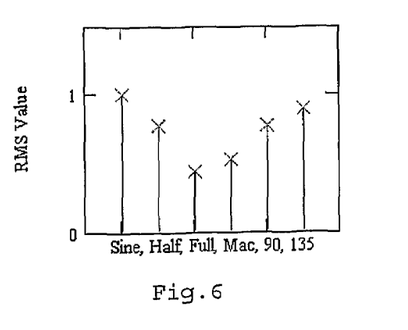
FIG. 6 illustrates the measured RMS errors caused by the blocking of the DC component of the waveforms of FIGS. 1 to 5.

To consider the desired results of the proposed compensation scheme, FIG. 6 shows the measured RMS for each of the waveforms described. These are assumed to have a minimum value on the zero axis (i.e. pulsed DC) and an amplitude to give them an RMS of unity. After AC coupling, the measured RMS are those shown. Note the sine wave trace is originally a zero offset sine wave for reference.

Firstly considering the peak values and zero crossing, these are not considered useful parameters in this particular application. In particular, peak values are very prone to noise and transients which may produce spurious results. Zero crossings likewise can be affected by noise at the crossing point causing multiple crossings. This could be improved by temporarily ignoring all crossings subsequent to an initial crossing to allow the waveform to move away from the zero line. However, even if this is achieved it should be noted that the 'M' waveform in FIG. 3 is very close to the line between two and four crossings per cycle. This means a small change in the waveform can produce a large step in results. This type of sudden discontinuity is not desirable, and a more continuous change in parameters is preferred.

Now considering an alternative approach, a measure of symmetry is used to compare the RMS values of negative and positive sections of the waveform cycle. This has little processing overheads since we need to know the total mean square (MS) at the end of the cycle anyway and this can be achieved by using addition of the MS sums for the positive and negative MS. The values have been calculated numerically, as well as the ratio between the two values in Table 8. If the ratio is less than one, then its reciprocal is used. This means the measurement is insensitive to inversion of the waveform.

TABLE 8

RMS of positive and negative parts of waveforms

| Waveform | Positive/Negative MS Ratio | Negative MS | Positive MS | Total MS | Total RMS |
|---|---|---|---|---|---|
| Sine | 1.00 | 0.50 | 0.50 | 1.00 | 1.00 |
| Half wave | 1.75 | 0.22 | 0.38 | 0.60 | 0.77 |
| Full wave | 1.45 | 0.11 | 0.08 | 0.19 | 0.44 |
| 'M' wave | 1.59 | 0.17 | 0.11 | 0.27 | 0.52 |
| 90° switched sine | 4.25 | 0.15 | 0.65 | 0.80 | 0.90 |
| 135° switched sine | 9.99 | 0.08 | 0.82 | 0.91 | 0.95 |

The mark-space ratios do not vary in a manner which allows any simple compensation of the errors. However, there is sufficient differences in this ratio to allow identification of the waveform. We can therefore form bands of these ratios, and use compensation factors of different magnitudes according to these bands. From the information above the bands can be defined using the midpoints of the adjacent values in the second column.

TABLE 9

Compensation bands

| Waveform | MS Ratio Band Lower limit | MS Ratio Band Upper limit | Compensation factor |
|---|---|---|---|
| Sine | 1.00 | 1.22 | 1.00 |
| Full wave | 1.22 | 1.51 | 1.68 |
| 'M' wave | 1.51 | 1.67 | 5.28 |
| Half wave | 1.67 | 3.00 | 3.66 |
| 90° switched sine | 3.00 | 7.12 | 1.25 |
| 135° switched sine | 7.12 | ∞ | 1.10 |

In essence, the process involves separately taking the IIR averaged MS of all negative values and positive values separately. These can be added to form final MS value as normal. The ratio of the two values can be calculated (and the reciprocal taken if less than one). The bands this value lies within are looked up in the table and the final MS value multiplied by the compensation factor. For non-sinusoidal waveforms this increases the sensitivity so the system is always safe. For arbitrary waveforms not considered, the system will also potentially become more sensitive.

Overall the system is very efficient since it simply splits the normal MS calculation into two streams the results of which are easily combined to form a final result. The compensation factor involves a multiplication. The biggest computational overhead is the division required for the ratio calculation. This is only required when a trip decision is being made but is demanding in clock cycles.

Various alterations and modifications may be made to the present invention without departing from the scope of the invention. For example, although particular embodiments refer to implementing the present invention on a single phase electrical installation, this is in no way intended to be limiting as, in use, the present invention can be incorporated into larger installations, both single and multi-phase.

The invention claimed is:

1. A method of disconnecting an electric supply to an electrical installation upon detection of a predetermined fault current between the line and neutral conductors of said electric supply, said line and neutral conductors inductively coupled as a primary winding of a current transformer, the method comprising the steps of:

monitoring a fault current waveform from the output of a secondary winding inductively coupled to said current transformer and responsive to said fault current on said electrical installation;

digitally encoding said fault current waveform outputted from said secondary winding;

detecting on or more parameters of said encoded fault current waveform and generating a compensation factor which compensates for specific pulsed DC fault components present in said encoded fault current waveform;

weighting said encoded fault current waveform in accordance with said compensation factor; and tripping a trip mechanism if said weighted fault current waveform exceeds said predetermined fault current.

2. The method as claimed in claim 1, wherein the step of detecting one or more parameters of said encoded fault current waveform are selected from: duty cycle, ratio of RMS values of the positive and negative portions of waveform, positive and negative peak values, number of zero crossings, form factor and crest factor.

3. The method as claimed in claim 1, wherein the step of detecting one or more parameters of said encoded fault current waveform are obtained from a measure of symmetry comparing the mean squared values of negative and positive sections of said encoded fault current waveform.

4. The method as claimed in claim 3, wherein the step of detecting one or more parameters of said encoded fault current waveform are obtained from a measure of symmetry comparing the ratio of the mean squared sum of the positive and negative halves of said encoded fault current waveform.

5. The method as claimed in claim 4, wherein the ratio of the mean squared sum of the positive and negative halves of said encoded fault current waveform further comprises the step of separately taking an infinite impulse response-averaged mean square of all positive values and negative values.

6. The method as claimed in claim 5, wherein the ratio of the mean squared sum of the positive and negative halves of said encoded fault current waveform is then calculated and the reciprocal taken if the result is less than one.

7. The method as claimed in claim 6, wherein various bands of the ratio of the mean squared sum of the positive and negative halves of said encoded fault current waveform are obtained, and said compensation factor is determined from a look-up table stored in a processing means.

8. The method as claimed in claim 4, wherein if the ratio of the mean squared sum of the positive and negative halves of said encoded fault current waveform lies within the range 1.00 to 1.22, then a sinusoidal AC fault current waveform is detected and a compensation factor of around 1.00 is generated.

9. The method as claimed in claim 4, wherein if the ratio of the mean squared sum of the positive and negative halves of said encoded fault current waveform lies within the range 1.22 to 1.51, then a full wave rectified DC fault current waveform is detected and a compensation factor of around 1.68 is generated.

10. The method as claimed in claim 4, wherein if the ratio of the mean squared sum of the positive and negative halves of said encoded fault current waveform lies within the range 1.51 to 1.67, then a 'M' wave rectified DC fault current waveform is detected and a compensation factor of around 5.28 is generated.

11. The method as claimed in claim 4, wherein if the ratio of the mean squared sum of the positive and negative halves of said encoded fault current waveform lies within the range 1.67 to 3.00, then a half wave rectified DC fault current waveform is detected and a compensation factor of around 3.66 is generated.

12. The method as claimed in claim 4, wherein if the ratio of the mean squared sum of the positive and negative halves of said encoded fault current waveform lies within the range 3.00 to 7.12, then a 90° switched sine fault current waveform is detected and a compensation factor of around 1.25 is generated.

13. The method as claimed in claim 4, wherein if the ratio of the mean squared sum of the positive and negative halves of said encoded fault current waveform lies within the range 7.12 to ∞, then a 135° switched sine fault current waveform is detected and a compensation factor of around 1.10 is generated.

14. The method as claimed in claim 1, wherein the step of detecting one or more parameters of said encoded fault current waveform is obtained from more complex types of waveshape analysis, including template matching or spectral analysis.

15. An apparatus for disconnecting an electric supply to an electrical installation upon detection of a predetermined fault current between the line and neutral conductors of said electric supply, said line and neutral conductors inductively coupled as a primary winding of a current transformer, the method comprising the steps of:
   monitoring means for monitoring a fault current waveform from the output of a secondary winding inductively coupled to said current transformer and responsive to said fault current on said electrical installation;
   encoding means for digitally encoding said fault current waveform outputted from said secondary winding;
   detection means for detecting one or more parameters of said encoded fault current waveform and generating a compensation factor which compensates for specified pulsed DC fault components present in said encoded fault current waveform;
   weighting means for weighting said encoded fault current waveform in accordance with said compensation factor; and
   tripping means for tripping a trip mechanism if said weighted fault current waveform exceeds said predetermined fault current.

16. The apparatus as claimed in claim 15, wherein the encoding means, detection means, and weighting means are implemented in a processing means which may be a microprocessor or digital signal processor.

17. The apparatus as claimed in claim 15, wherein said processing means is programmable and includes other ancillary features, including undervoltage release or warning indication.

18. The apparatus as claimed in claim 15, wherein said secondary winding is a single or multi-turn winding.

19. The apparatus as claimed in claim 15, wherein said detection means for detecting one or more parameters of said encoded fault current waveform are selected from: duty cycle, ratio of RMS values of the positive and negative portions of waveform, positive and negative peak values, number of zero crossings, form factor and crest factor.

20. The apparatus as claimed in claim 15, wherein said detection means for detecting one or more parameters of said encoded fault current waveform are obtained from a measure of symmetry comparing the mean squared values of negative and positive sections of said encoded fault current waveform.

21. The apparatus as claimed in claim 20, wherein said detection means for detecting one or more parameters of said encoded fault current waveform are obtained from a measure of symmetry comparing the ratio of the mean squared sum of the positive and negative halves of said encoded fault current waveform.

22. The apparatus as claimed in claim 21, wherein the ratio of the mean squared sum of the positive and negative halves of said encoded fault current waveform further comprises the step of separately taking an infinite impulse response-averaged mean square of all positive values and negative values.

23. The apparatus as claimed in claim 21, wherein the ratio of the mean squared sum of the positive and negative halves of said encoded fault current waveform is then calculated and the reciprocal taken if the result is less than one.

24. The apparatus as claimed in claim 23, wherein various bands of the ratio of the mean squared sum of the positive and negative halves of said encoded fault current waveform are obtained, and said compensation factor is determined from a look-up table stored in said processing means.

25. The apparatus as claimed in claim 21, wherein if the ratio of the mean squared sum of the positive and negative halves of said encoded fault current waveform lies within the range 1.00 to 1.22, then a sinusoidal AC fault current waveform is detected and a compensation factor of around 1.00 is generated.

26. The apparatus as claimed in claim 21, wherein if the ratio of the mean squared sum of the positive and negative halves of said encoded fault current waveform lies within the range 1.22 to 1.51, then a full wave rectified DC fault current waveform is detected and a compensation factor of around 1.68 is generated.

27. The apparatus as claimed in claim 21, wherein if the ratio of the mean squared sum of the positive and negative halves of said encoded fault current waveform lies within the range 1.51 to 1.67, then a 'M' wave rectified DC fault current waveform is detected and a compensation factor of around 5.28 is generated.

28. The apparatus as claimed in claim 21, wherein if the ratio of the mean squared sum of the positive and negative halves of said encoded fault current waveform lies within the range 1.67 to 3.00, then a half wave rectified DC fault current waveform is detected and a compensation factor of around 3.66 is generated.

29. The apparatus as claimed in claim 21, wherein if the ratio of the mean squared sum of the positive and negative halves of said encoded fault current waveform lies within the range 3.00 to 7.12, then a 90° switched sine fault current waveform is detected and a compensation factor of around 1.25 is generated.

30. The apparatus as claimed in claim 21, wherein if the ratio of the mean squared sum of the positive and negative halves of said encoded fault current waveform lies within the range 7.12 to ∞, then a 135° switched sine fault current waveform is detected and a compensation factor of around 1.10 is generated.

31. The method as claimed in claim 1, wherein said detection means for detecting one or more parameters of said encoded fault current waveform is obtained from more complex types of waveshape analysis, including template matching or spectral analysis.

32. A computer program product on a computer readable storage medium operatively installed on a computer for disconnecting an electric supply to an electrical installation upon detection of a predetermined fault current between the line and neutral conductors of said electric supply, said line and neutral conductors inductively coupled as a primary winding of a current transformer, the computer program executing on the computer for performing the method comprising the steps of:

monitoring a fault current waveform from the output of a secondary winding inductively coupled to said current transformer and responsive to said fault current on said electrical installation;

digitally encoding said fault current waveform outputted from said secondary winding;

detecting one or more parameters of said encoded fault current waveform and generating a compensation factor which compensates for specific pulsed DC fault components present in said encoded fault current waveform;

weighting said encoded fault current waveform in accordance with said compensation factor; and tripping a trip mechanism if said weighted fault current waveform exceeds said predetermined fault current.

33. The computer program product as claimed in claim 32, wherein said computer program means for detecting one or more parameters of said encoded fault current waveform are selected from: duty cycle, ratio of RMS values of the positive and negative portions of waveform, positive and negative peak values, number of zero crossings, form factor and crest factor.

34. The computer program product as claimed in claim 32, wherein said computer program means for detecting one or more parameters of said encoded fault current waveform are obtained from a measure of symmetry comparing the mean squared values of negative and positive sections of said encoded fault current waveform.

35. The computer program product as claimed in claim 34, wherein said computer program means for detecting one or more parameters of said encoded fault current waveform are obtained from a measure of symmetry comparing the ratio of the mean squared sum of the positive and negative halves of said encoded fault current waveform.

36. The computer program product as claimed in claim 35, wherein the ratio of the mean squared sum of the positive and negative halves of said encoded fault current waveform further comprises the step of separately taking an infinite impulse response-averaged mean square of all positive values and negative values.

37. The computer program product as claimed in claim 35, wherein the ratio of the mean squared sum of the positive and negative halves of said encoded fault current waveform is then calculated and the reciprocal taken if the result is less than one.

38. The computer program product as claimed in claim 37, wherein various bands of the ratio of the mean squared sum of the positive and negative halves of said encoded fault current waveform are obtained, and said compensation factor is determined from a look-up table stored in a processing means.

39. The computer program product as claimed in claim 35, wherein if the ratio of the mean squared sum of the positive and negative halves of said encoded fault current waveform lies within the range 1.00 to 1.22, then a sinusoidal AC fault current waveform is detected and a compensation factor of around 1.00 is generated.

40. The computer program product as claimed in claim 35, wherein if the ratio of the mean squared sum of the positive and negative halves of said encoded fault current waveform lies within the range 1.22 to 1.51, then a full wave rectified DC fault current waveform is detected and a compensation factor or around 1.68 is generated.

41. The computer program product as claimed in claim 35, wherein if the ratio of the mean squared sum of the positive and negative halves of said encoded fault current waveform lies within the range 1.51 to 1.67, then a 'M' wave rectified DC fault current waveform is detected and a compensation factor of around 5.28 is generated.

42. The computer program product as claimed in claim 35, wherein if the ratio of the mean squared sum of the positive and negative halves of said encoded fault current waveform lies within the range 1.67 to 3.00, then a half wave rectified DC fault current waveform is detected and a compensation factor of around 3.66 is generated.

43. The computer program product as claimed in claim 35, wherein if the ratio of the mean squared sum of the positive and negative halves of said encoded fault current waveform lies within the range 3.00 to 7.12, then a 90° switched sine fault current waveform is detected and a compensation factor or around 1.25 is generated.

44. The computer program product as claimed in claim 35, wherein if the ratio of the mean squared sum of the positive and negative halves of said encoded fault current waveform lies within the range 7.12 to $\infty$, then a 135° switched sine fault current waveform is detected and a compensation factor of around 1.10 is generated.

45. The computer program product as claimed in claim 32, wherein said computer program means for detecting one or more parameters of said encoded fault current waveform is obtained from more complex types of waveshape analysis, including template matching or spectral analysis.

* * * * *

UNITED STATES PATENT AND TRADEMARK OFFICE
CERTIFICATE OF CORRECTION

PATENT NO. : 8,340,829 B2
APPLICATION NO. : 12/374008
DATED : December 25, 2012
INVENTOR(S) : Jonathan Keith Jackson Page 1 of 1

It is certified that error appears in the above-identified patent and that said Letters Patent is hereby corrected as shown below:

Col. 12, line 7, "on" should be changed to --one--.

Col. 13, line 48, "15" should be changed to --16--.

Signed and Sealed this
Nineteenth Day of February, 2013

Teresa Stanek Rea
*Acting Director of the United States Patent and Trademark Office*